United States Patent
Liu et al.

(10) Patent No.: US 11,954,453 B2
(45) Date of Patent: Apr. 9, 2024

(54) NATURAL LANGUAGE GENERATION BY AN EDGE COMPUTING DEVICE

(71) Applicant: INTERNATIONAL BUSINESS MACHINES CORPORATION, Armonk, NY (US)

(72) Inventors: Chih-Hsiung Liu, Taipei (TW); I-Chien Lin, Taipei (TW); Cheng-Fang Lin, New Taipei (TW); Joey H. Y. Tseng, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1164 days.

(21) Appl. No.: 16/299,665

(22) Filed: Mar. 12, 2019

(65) Prior Publication Data

US 2020/0293914 A1    Sep. 17, 2020

(51) Int. Cl.
*G10L 25/00* (2013.01)
*G06F 17/18* (2006.01)
(Continued)

(52) U.S. Cl.
CPC ............. *G06F 40/56* (2020.01); *G06F 17/18* (2013.01); *G06F 18/2148* (2023.01); *G06N 3/08* (2013.01);
(Continued)

(58) Field of Classification Search
CPC . G10L 5/07; G10L 15/20; G10L 15/22; G10L 15/26; G10L 15/30; G10L 15/02; G10L 15/063; G10L 15/16; G10L 25/30; G10L 21/0208; G10L 25/78; G10L 25/87; G10L 15/08; G10L 15/1815; G10L 15/197; G10L 15/14; G10L 15/1822; G10L 15/183; G10L 15/19; G10L 15/193; G10L 19/00; G10L 25/27; G10L 19/005
See application file for complete search history.

(56) References Cited

U.S. PATENT DOCUMENTS 8,527,278 B2    9/2013  David
9,491,187 B2    11/2016 Sridhara et al.
(Continued)

OTHER PUBLICATIONS

Metz, "Voice Recognition for the Internet of Things", https://www.technologyreview.com/s/531936/voice-recognition-for-the-internet-of-things/, MIT Technology Review, Oct. 24, 2014, 5 pages.
(Continued)

*Primary Examiner* — Vu B Hang
(74) *Attorney, Agent, or Firm* — Gavin Giraud; Andrew D. Wright; Calderon Safran & Cole, P.C.

(57) ABSTRACT

Systems and methods for natural language generation by an edge computing device are disclosed. In one embodiments, a method comprises: receiving, by an edge computing device, event data from an edge event; determining, by the edge computing device, that a network connection to a cloud server is not available; extracting, by the edge computing device, features of the event data; predicting, by a local neural network of the edge computing device, an action for the edge computing device to take based on the features of the event data, wherein the action is associated with a confidence level; and determining, by the edge computing device, whether the confidence level meets a predetermined threshold value.

20 Claims, 7 Drawing Sheets

(51) Int. Cl.
| | |
|---|---|
| *G06F 18/214* | (2023.01) |
| *G06F 40/56* | (2020.01) |
| *G06N 3/08* | (2023.01) |
| *G06N 5/025* | (2023.01) |
| *G06V 10/764* | (2022.01) |
| *G06V 10/774* | (2022.01) |
| *G06V 10/80* | (2022.01) |
| *G06V 10/82* | (2022.01) |
| *G10L 25/30* | (2013.01) |
| *G10L 15/02* | (2006.01) |
| *G10L 15/16* | (2006.01) |

(52) U.S. Cl.
CPC .......... *G06N 5/025* (2013.01); *G06V 10/764* (2022.01); *G06V 10/7747* (2022.01); *G06V 10/806* (2022.01); *G06V 10/82* (2022.01); *G10L 25/30* (2013.01); *G10L 15/02* (2013.01); *G10L 15/16* (2013.01)

(56) References Cited

U.S. PATENT DOCUMENTS

| | | | | |
|---|---|---|---|---|
| 9,508,339 | B2* | 11/2016 | Kannan | G10L 15/063 |
| 9,811,765 | B2* | 11/2017 | Wang | G06F 16/51 |
| 9,953,653 | B2* | 4/2018 | Newman | G10L 15/30 |
| 9,978,367 | B2* | 5/2018 | Aleksic | G06F 40/30 |
| 10,007,513 | B2 | 6/2018 | Malladi et al. | |
| 10,192,555 | B2* | 1/2019 | Lovitt | G10L 15/32 |
| 10,854,192 | B1* | 12/2020 | Maas | G10L 15/26 |
| 2013/0262349 | A1 | 10/2013 | Bouqata et al. | |
| 2016/0378080 | A1 | 12/2016 | Uppala et al. | |
| 2017/0163435 | A1 | 6/2017 | Ehsani et al. | |

OTHER PUBLICATIONS

Anonymous, "At CES 2018: Fluent.ai announces self-serve software platform to voice enable the world's devices", https://www.fluent.ai/2018/01/06/3528/, fluent.ai, Dec. 20, 2017, 7 pages.

Coucke et al., Benchmarking Natural Language Understanding Systems: Google, Facebook, Microsoft, Amazon, and Snips, https://medium.com/snips-ai/benchmarking-natural-language-understanding-systems-google-facebook-microsoft-and-snips-2b8ddcf9fb19, Jun. 2, 2017, 10 pages.

White et al., "Smart Cities with Deep Edges", https://www.researchgate.netpublication/326914706_Smart_Cities_with_Deep_Edges, Aug. 2018, 12 pages.

Atlam et al., "Fog Computing and the Internet of Things: A Review", http://www.mdpi.com/2504-2289/2/2/10, MDPI, Apr. 8, 2018, 18 pages.

Wang et al., "Edge Cloud Offloading Algorithms: Issues, Methods, and Perspectives", https://arxiv.org/pdf/1806.06191.pdf, Cornell University Library, vol. 1, No. 1, Article 1, Jun. 16, 2018, 23 pages.

Handelman, "Integrating Neural Networks and Knowledge-Based Systems for Intelligent Robotic Control", https://patents.google.com/scholar/3607152530364944993?q=reflex&q=network&scholar, IEEE Control Systems Magazine, Apr. 1990, 11 pages.

Mell et al., "The NIST Definition of Cloud Computing", NIST, Special Publication 800-145, Sep. 2011, 7 pages.

* cited by examiner

NATURAL LANGUAGE GENERATION BY AN EDGE COMPUTING DEVICE

BACKGROUND

The present invention relates generally to edge computing and, more particularly, to natural language generation by an edge computing device.

The term edge computing is used to describe computer technology that enables cloud-connected devices (edge devices) to process data closer to where it is created, which is referred to as the "edge". The edge can be either within the edge device itself (e.g., sensors), or close to the edge device, and provides an alternative to sending data to a centralized cloud for processing.

Smart devices that support natural language conversation, such as voice-responsive intelligent personal assistant devices, are gaining popularity. Such smart devices typically perform speech recognition (e.g., speech-to-text processing) of a spoken user command, pass the recognized speech in the form of text to a cloud server for natural language processing (e.g., intent classification and entity extraction), and then receive a response from the cloud server (typically a text string) to be verbalized to a user through a local speaker associated with the smart device. Such cloud servers may utilize neural networks in the performance of natural language processing.

A convolutional neural network (CNN) is a class of deep neural networks which is commonly utilized to analyze visual imagery. A recurrent neural network (RNN) is a class of artificial neural network where connections between nodes form a direct graph along a sequence. In RNNs, a chunk of neural network looks at some input and outputs a value. A loop allows information to be passed from one step of the network to the next. A long short-term memory (LSTM) network is a kind of RNN capable of learning long-term dependencies.

SUMMARY

In a first aspect of the invention, there is a computer-implemented method including: receiving, by an edge computing device, event data from an edge event; determining, by the edge computing device, that a network connection to a cloud server is not available; extracting, by the edge computing device, features of the event data; predicting, by a local neural network of the edge computing device, an action for the edge computing device to take based on the features of the event data, wherein the action is associated with a confidence level; and determining, by the edge computing device, whether the confidence level meets a predetermined threshold value.

In another aspect of the invention, there is a computer program product including a computer readable storage medium having program instructions embodied therewith. The program instructions are executable by a computing device to cause the computing device to: receive event data from an edge event; determine that a network connection to a remote cloud server is not available; extract features of the event data; determine context of the event data based on the features; predict, by a local neural network of the computing device, an action for the computing device to take based on the features and context, wherein the action is associated with a confidence level; and determine whether the confidence level meets a predetermined threshold value.

In another aspect of the invention, there is system including a processor, a computer readable memory, and a computer readable storage medium. The system further includes: program instructions to receive event data for an edge event; program instructions to determine that a network connection to a remote cloud server is not available; program instructions to extract features of the event data; program instructions to predict, by a local neural network of the computing device, an action for the computing device to take based on the features, wherein the action is associated with a confidence level; program instructions to determine whether the confidence level meets a predetermined threshold value; program instructions to implement the action based on a determination that the confidence level meets the predetermined threshold value; and program instructions to determine whether the network connection to the cloud server is now available when the confidence level does not meet the predetermined threshold value. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to edge computing and, more particularly, to natural language generation by an edge computing device. In embodiments, a system trains a local neural network at an edge device (e.g., a voice-responsive intelligent personal assistant device) to predict a next appropriate action in response to an input (e.g., voice command) at the edge device, as opposed to receiving the next appropriate action from a cloud-based server. In this manner, implementations of the invention enable an edge device to bypass neural network processing at the cloud server when a network connection between the cloud server and the edge device is unavailable and the local neural network is likely to supply a correct response to an input (e.g., there is a high confidence for a response). In aspects, a local neural network based on long short-term memory (LSTM) architecture at an edge device predicts a next appropriate action to take based on: (a) an event generated at the edge device, and its features; and (b) a command (e.g., rules-based action) generated by a cloud application (typically a response text), wherein event data is utilized as training data for the local neural network and the command generated by the cloud application is utilized for classification purposes at the edge device.

Smart devices that support natural language conversation, such as voice-responsive intelligent personal assistant devices, are gaining popularity. However, such smart device systems rely heavily on the availability of a cloud server (e.g., a cloud brain) to provide the device with appropriate responses to user inputs. Typically, smart devices, such as voice-responsive intelligent personal assistant devices, perform speech to text conversions at the smart device, and send the text to a cloud-based server for natural language processing. In response to receiving text from a smart devices, the cloud-based server determines one or more actions for the smart device to take based on natural language processing of the text, and sends the one or more actions to the smart device to perform. In cases where a network connection between the smart device and the cloud-based server is unreliable (e.g., subject to intermittent failure), the smart device will not be able to function properly. Accordingly, embodiments of the invention utilize unconventional local network architecture that allows an edge device (e.g., a smart device in an edge environment) to learn from interactions with the cloud-based server and generate appropriate actions in response to user inputs, without going through the full conventional computation steps defined in associated cloud applications.

Accordingly, embodiments of the invention constitute improvements to the function of smart devices. Advantageously, aspects of the invention utilize unconventional steps and programming at the smart device to enable the smart device to selectively bypass cloud-based server processing steps typically utilized by smart devices. Moreover, embodiments of the invention utilize a special purpose computing device in the form of an improved voice-responsive intelligent personal assistant device (edge device) to determine and communicate responses to user inputs based on predicted results generated at the edge device.

In one illustrative use scenario, a smart device in the form of a robot in an edge environment is configured to perform facial recognition and detect that a face of a user is present. A facial recognition module at the edge environment first tries to recognize the user based on facial recognition techniques. The recognition result is passed to a cloud application at a cloud server, which interacts with one or more computing systems to collect required information based on the recognition result to generate a final response. For example, a final response may comprise a response to a user Tony of "Hello Tony, how are you?". The cloud server then passes the response back to the robot in the form of response text, and the robot plays a voice file using a text-to-speech library to implement the final response. In this scenario, the input comprising the face recognition event with identity, and the output in the form of the response text, are collected during each event/command loop, and are used to train a local neural network at the robot asynchronously. In cases where a network connection between the robot and the cloud server are not available (e.g., the robot cannot connect with its cloud application), the local neural network may be used to generate the final response without going through the cloud application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
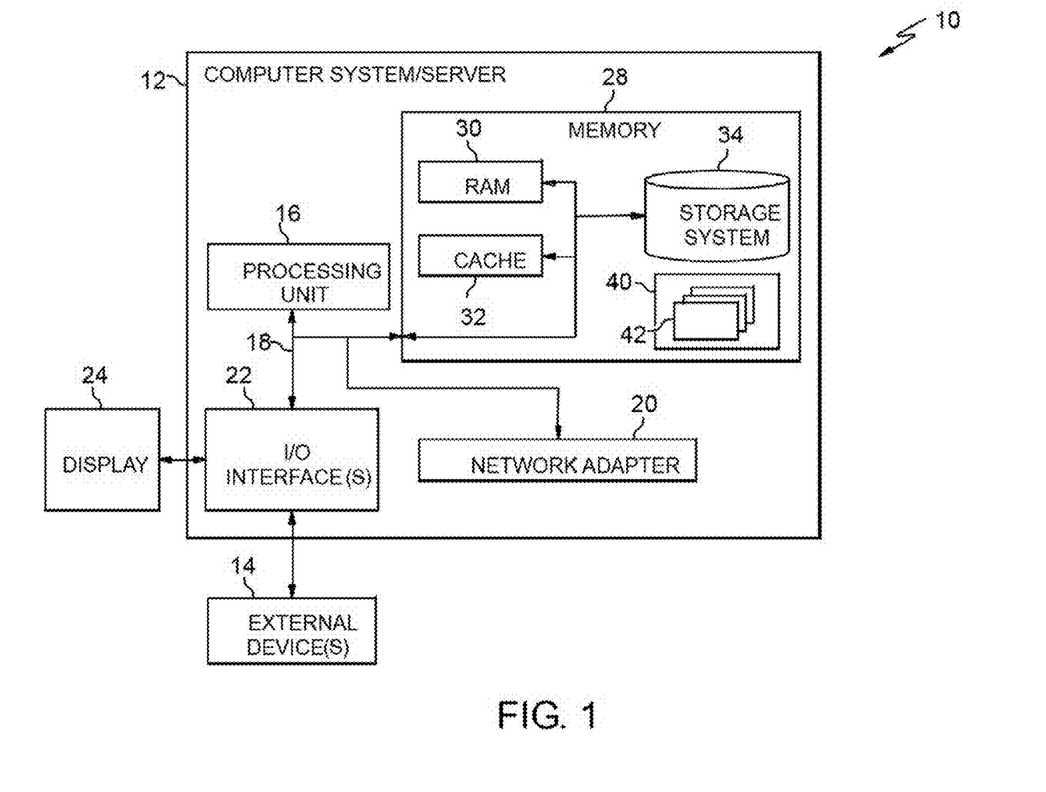
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
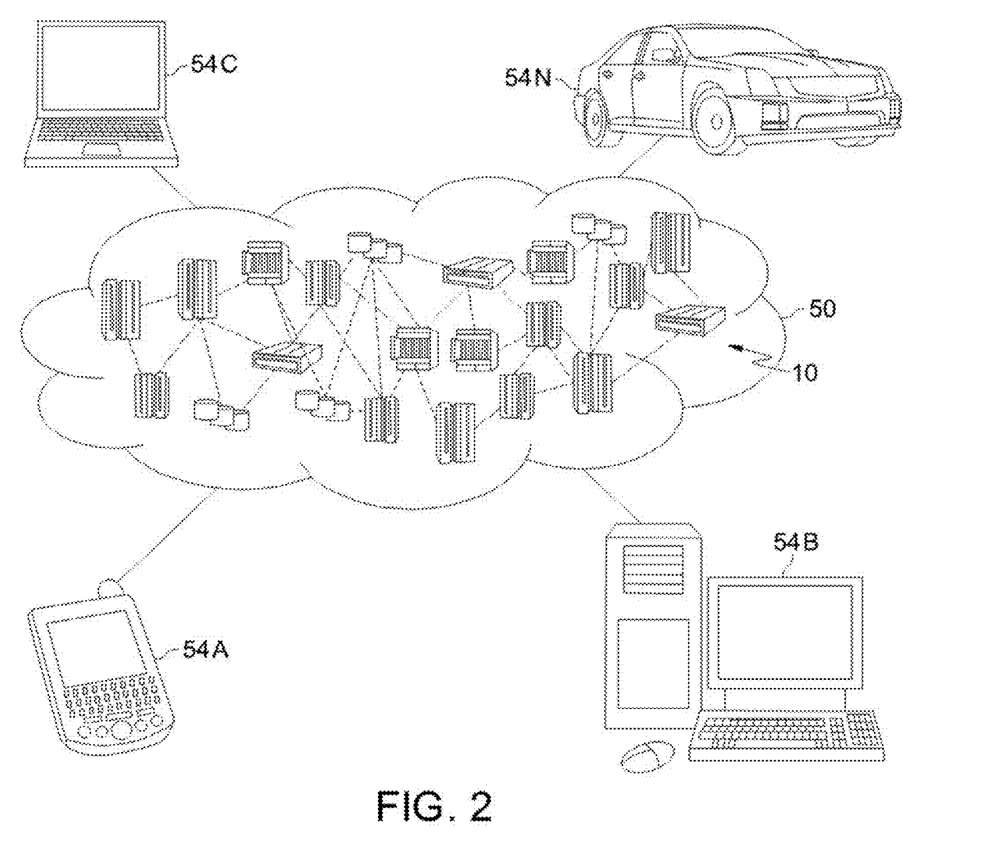
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
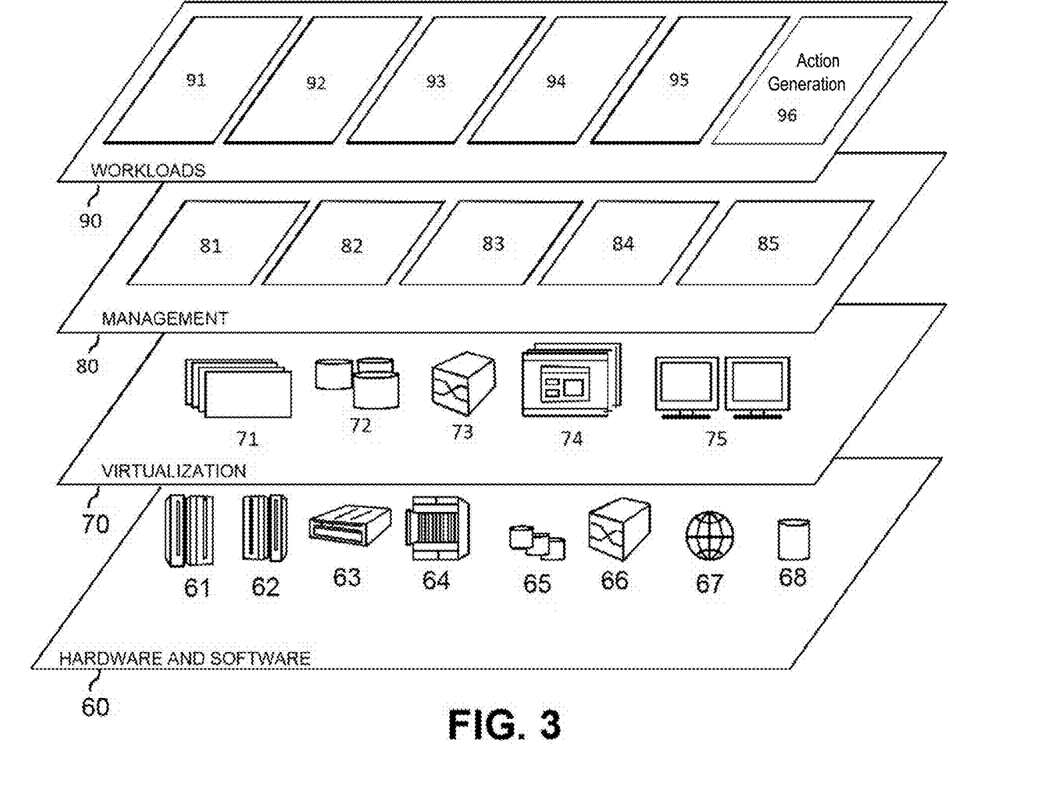
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action generation 96. Action generation may include, for example, one or more predicted responses to a user voice-command received from a remote user computer device (e.g., edge device).

Implementations of the invention may include a computer system/server 12 of FIG. 1 in which one or more of the program modules 42 are configured to perform (or cause the computer system/server 12 to perform) one of more functions of an action generator (action generation 96) of FIG. 3. For example, the one or more of the program modules 42 may be configured to: receive text input from a remote edge device, predict one or more next actions in response to the input, and send next action data to the remote edge device.

Figure 4:
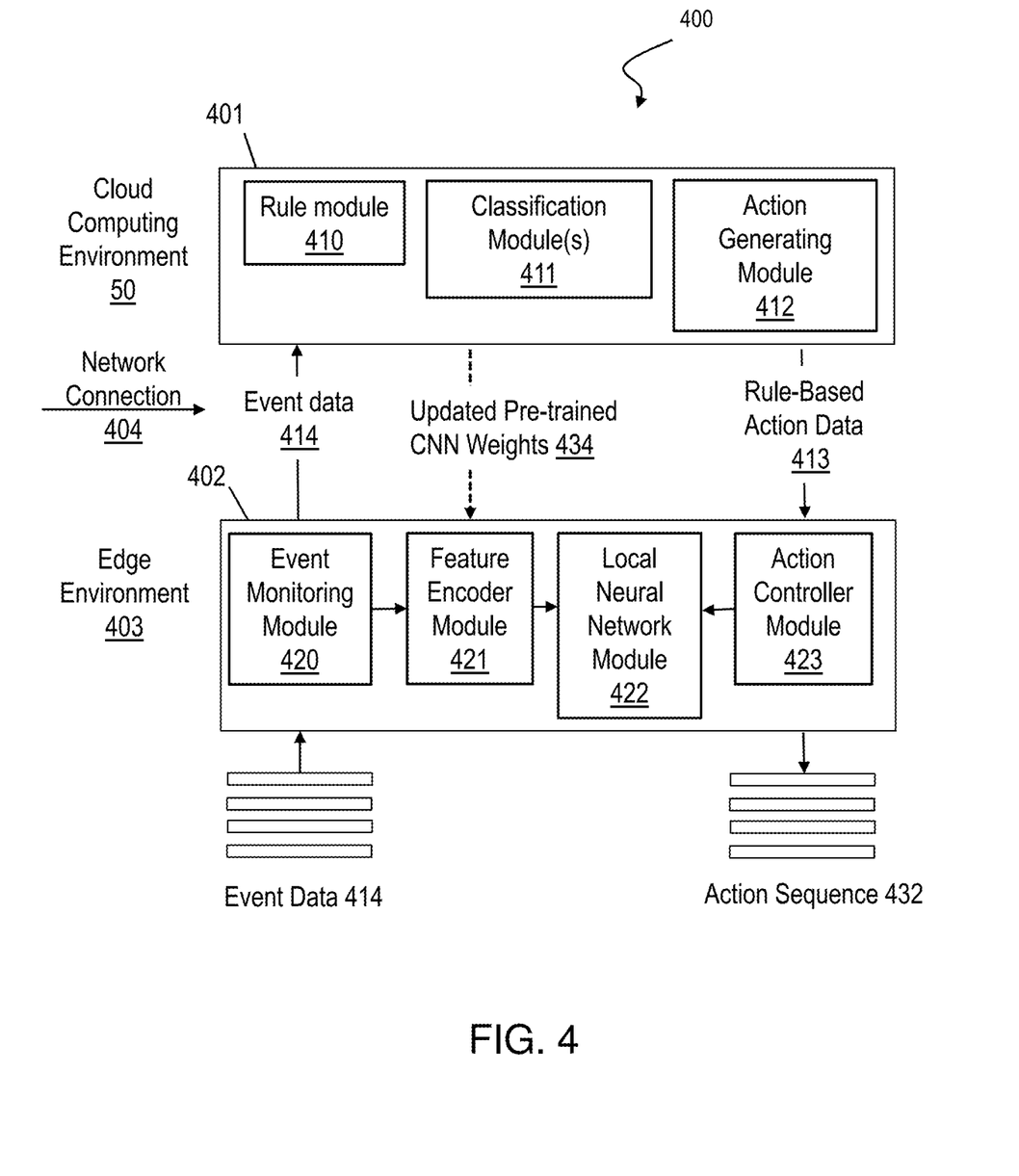
FIG. 4 shows a block diagram of an exemplary environment in accordance with embodiments of the invention.

FIG. 4 shows a block diagram of an exemplary machine reasoning environment 400 in accordance with aspects of the invention. In embodiments, the environment 400 includes a cloud server (cloud engine) 401 in a cloud computing environment 50 in communication with a remote edge device 402 (e.g., a voice-responsive intelligent personal assistant device) in an edge environment 403 via a network represented at 404. In aspects, the cloud server 401 is a rule-based behavior controller. The cloud server 401 may be a special purpose computing device. For example, the cloud server 401 may be operated by a service provider providing machine reasoning services (e.g., responses to user voice commands or questions) to remote computing devices (e.g., personal computing devices such as stand-alone voice-responsive intelligent personal assistant devices and/or smartphones). In aspects, the cloud server 401 comprises, or includes one or more aspects of, the computer system/server 12 of the cloud computing node 10 shown in FIG. 1. Further, in implementations, the cloud server 401 comprises one or more functional abstract layers of the cloud computing environment 50, as depicted in FIG. 3.

The network 404 may be any suitable communication network or combination of networks, such as a local area network (LAN), a general wide area network (WAN), and/or a public network (e.g., the Internet). The edge device 402 may be any computing device providing an entry point to the cloud server 401 of a service provider, including stand-alone voice-responsive intelligent personal assistant devices, laptop computers, tablet computers, smartphones, other smart devices, etc. In implementations, the edge device 402 is in the form of one of the personal digital assistant (PDA) or cellular telephone 54A, the desktop computer 54B, the laptop computer 54C, and/or the automobile computer system 54N of FIG. 2. In aspects, the edge device 402 includes one or more aspects of the computer system/server 12 shown in FIG. 1. In embodiments, the edge device 402 runs an application program that provides an interface by which a user may enter event data (e.g., voice commands) for processing and/or sharing with the cloud server 401.

The cloud server 401 and the edge device 402 may each include one or more program modules (e.g., program module 42 of FIG. 1) executed by the respective cloud server 401 or edge device 402. In an exemplary embodiment shown, the cloud server 401 includes a rule module (rules engine) 410 configured to store and implement processing rules for the cloud server 401, a classification module 411 configured to classify data (e.g., audio, image and text data) received by the cloud server 401, and an action generating module 412 (e.g., incorporating action generator 96 of FIG. 3) configured to generate rule-based action data 413 based on event data 414 received by the cloud server 401 from the edge device 402.

Additionally, in the exemplary embodiment shown, the edge device 402 includes an event monitoring module 420 configured to monitor for and receive event data 414 (e.g., user voice commands), a feature encoder module 421 configured to determine features and context of event data 414, a local neural network module 422 configured to predict responses (predicted actions) to event data 414, and an action controller module 423 configured to receive and store rule-based action data 413 received from the cloud server 401 in response to associated event data 414. In aspects, data from an event (event data 414), such as image data and/or audio data, is received at the edge device 402. In embodiments, convolutional neural networks (CNNs) of the feature encoder module 421 are configured to transform structured or unstructured event data 414 from the event monitoring module 420 into high-dimensional vectors for input into the local neural network module 422. In aspects, the local neural network module 422 is a sequence-to-sequence model neural network trained (e.g., in an ongoing basis) with event data 414 and rule-based action data 413.

In aspects, the edge device 402 is configured to implement an action sequence 432 (e.g., audio response to a user's command, etc.) in response to event data 414 received. In implementations, the action controller module 423 is configured to execute commands generated by the cloud server 401 and/or the local neural network module 422. In aspects, the feature encoder module 421 of the edge device 402 is configured to receive updated pre-trained CNN weight data 434 from the cloud server 401, wherein the weight data 434 is utilized by the feature encoder module 421 to improve CNN processing of event data 414 at the edge device 402.

Figure 5:
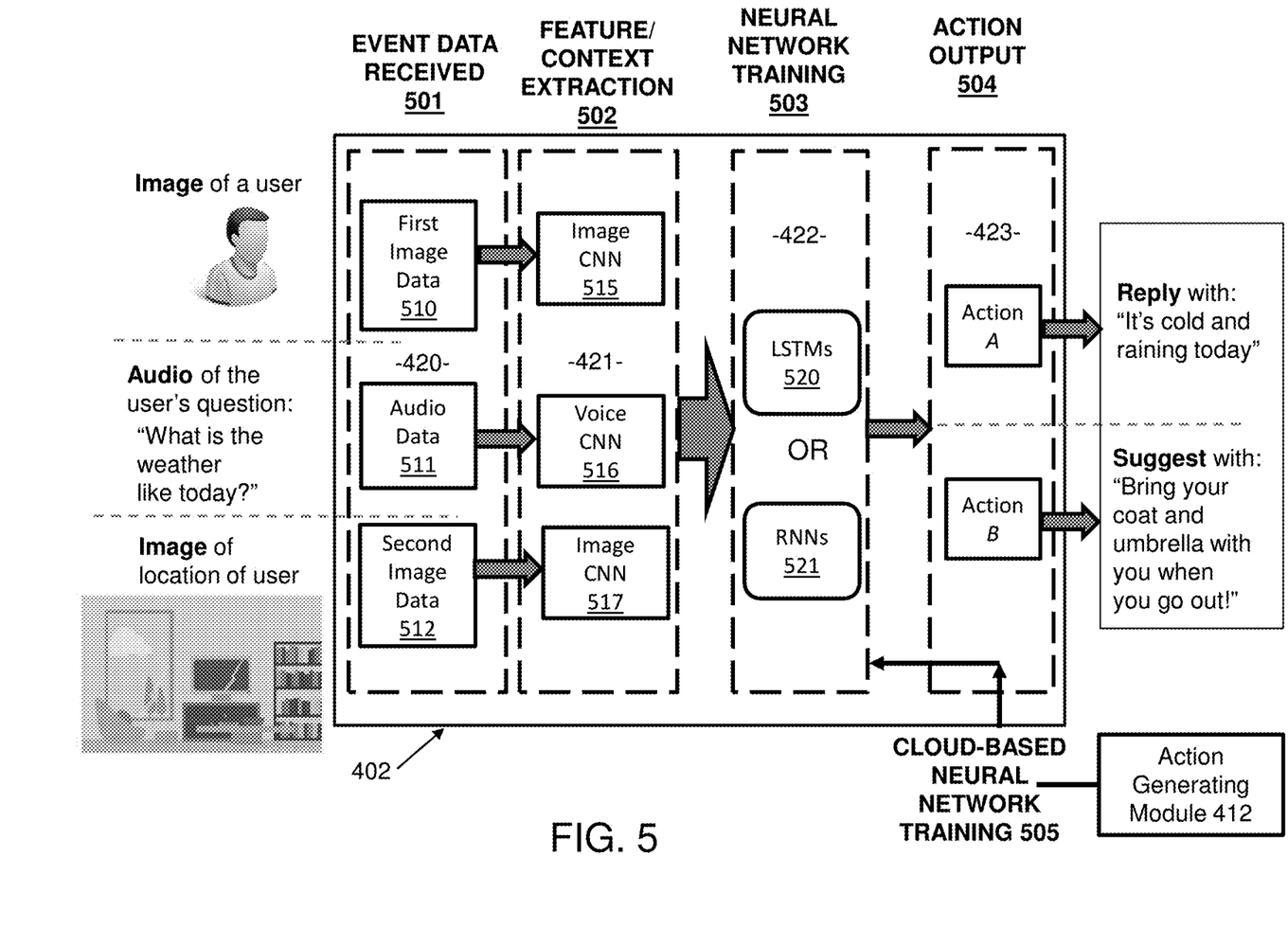
FIG. 5 shows a diagram of an exemplary local neural network training scenario in accordance with embodiments of the invention.

FIG. 5 shows a diagram of an exemplary local neural network training scenario in accordance with embodiments of the invention. Steps depicted in FIG. 5 may be carried out in the environment of FIG. 4 and are described with reference to elements depicted in FIG. 4.

At step 501, event data 510-512 (e.g., event data 414 of FIG. 4) is received by an edge device 402 during an edge event. An edge event may be initiated, for example, by a voice command from a user being received at the edge device 402. In embodiments, the event monitoring module 420 of the edge device 402 receives the event data 510-512. In the example shown, the event data includes first image data 510 regarding the image of a user; audio data 511 regarding the user's verbal question "What is the weather like today?"; and second image data 512 regarding an image of a location of the user. In implementations, the event data 510-512 is received by the edge device 402 via one or more cameras, microphones, or user interfaces (not depicted) integrated with or connected to the edge device 402. In embodiments, existing data gathering techniques and tools are utilized by the edge device 402 to gather event data (e.g., via microphones, cameras, user interfaces, etc. in the edge environment 403) in accordance with step 501.

At step 502, features and context of the event data 510-512 received at step 501 are extracted by the edge device 402 through the use of feature extraction methods and tools. Various natural language processing tools may be utilized by the edge device 402 in the implementation of feature and context extraction at step 502. In aspects, the edge device 402 utilizes speech-to-text tools to convert audio data 511 received at step 501 to text-based data. In general, the term feature refers to the subject matter of the event data 510-512, including relationships and indicators of intent. For example, the feature encoder module 421 may extract features indicating the identity of a user from the first image data 510. In general, the term context as used herein refers to the circumstances that form the setting for the edge event. In one example, the edge device 402 extracts the subject matter and intent of a user's verbalized question, and the context in which the user is presenting the question (e.g., in the living room of the user). In embodiments, the feature encoder module 421 of the edge device 402 extracts features of the event data 510-512 (i.e., performs feature extraction).

In implementations, the edge device 402 utilizes a plurality of CNNs to extract features of the event data 510-512 in a normalized way in order to provide the extracted features as an input for LSTM neural networks or recurrent neural networks (RNNs) of the local neural network module 422, for training purposes. In the example shown in FIG. 5, an image CNN 515 extracts features of the first image data 510, a voice CNN 516 extracts features of audio data 511 and an image CNN 517 extracts features of the second image data 512.

At step 503, the local neural network module 422 of the edge device 402 obtains features and context information extracted at step 502 and utilizes LSTM neural networks or RNNs to generate an output of predicted actions. The term predicted actions as used herein refers to one or more actions to be implemented (e.g., as an action sequence 432) by the edge device 402 based on data (e.g., event data 414) from an associated edge event. In accordance with embodiments of the invention, predicted actions may be generated at the cloud server 401 or at the edge device 402. In accordance with embodiments of the invention, the LSTM or RNNs of the edge device 402 are trained with data received from the cloud server 401, as discussed in more detail with respect to step 505 and FIG. 6.

At step 504, the edge device 402 implements the one or more predicted actions generated at step 503 as an action output (e.g., action sequence 432). In the example shown, the action output comprises a first action A and a second action B, wherein the first action A is an audio reply to the user comprising "It's cold and raining today", and the second action B is an audio suggestion to the user to "Bring your coat and umbrella with you when you go out". In embodiments, the action controller module 423 of the edge device 402 implements step 504.

At step 505, the edge device 402 receives cloud-based predicted actions (e.g., rule-based action data 413) from the cloud server 401. In implementations, the action generating module 412 of the cloud server 401 provides cloud-based actions to the action controller module 423 of the edge device 402, which in turn shares the cloud-based actions with the local neural network module 422, for training purposes. Additional details regarding training of the edge device 402 are depicted in FIG. 6.

Figure 6:
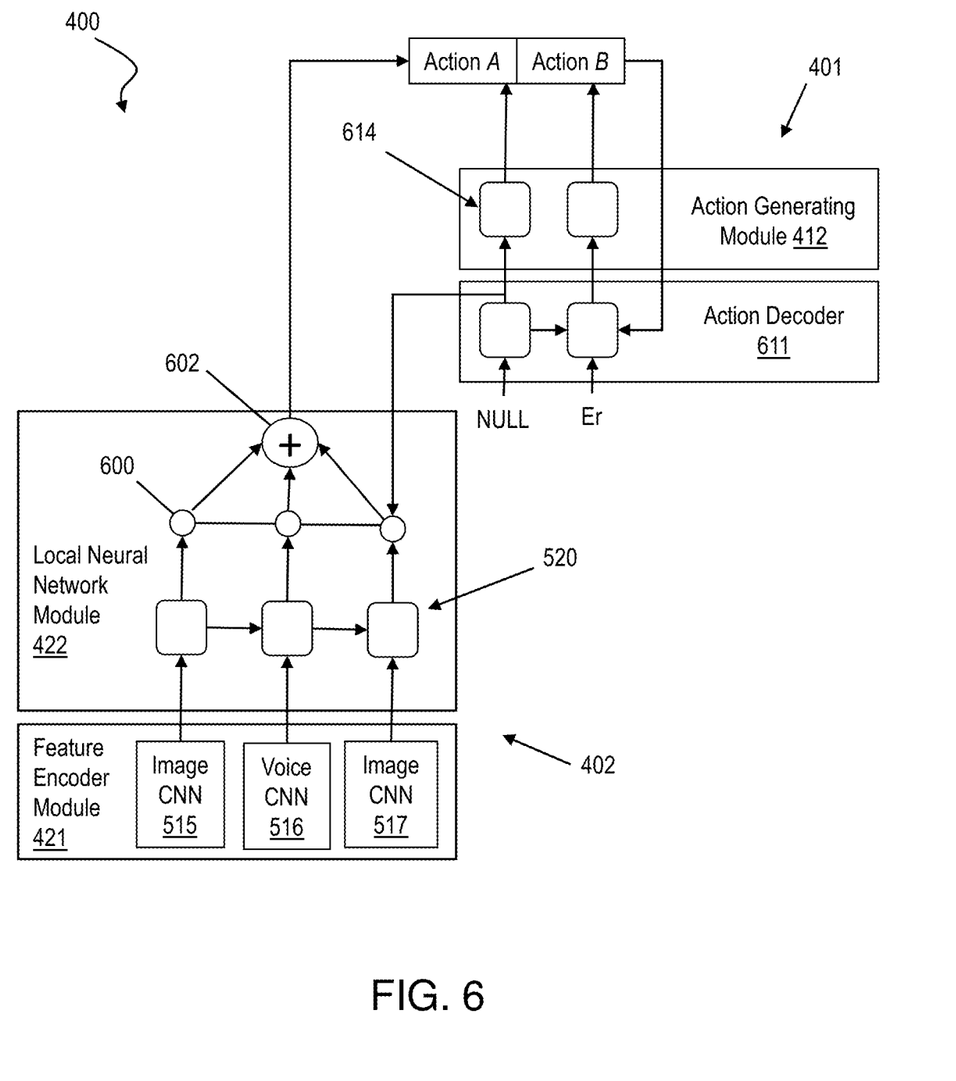
FIG. 6 depicts a neural network training environment in accordance with embodiments of the invention.

FIG. 6 depicts the use of rule-based predicted actions as training data for a local neural network module of an edge device. The training depicted in FIG. 6 may be implemented in the environment of FIG. 4, and in accordance with components and steps depicted in FIG. 5.

As depicted in FIG. 6, the feature encoder module 421 of the edge device 402 sends feature and context data to corresponding RNNs 521 in the local neural network module 422 in the form of high dimensional vectors. The RNNs 521 output results at 600, which are incorporated into a training model 602. In the implementation shown, the training model 602 at the edge device 402 is utilized to output action sequences 432 in the form of Action A and Action B.

In the example shown, the action generating module 412 of the cloud server 401 includes neural networks indicated at 614, which also determine output Action A and Action B. In other words, once local neural network module 422 receives sufficient training data, the predicted action output of the local neural network module 422 based on event data, and the rule-based action output of the cloud server 401 based on the same event data, are the same, in this example. In embodiments, an action decoder 611 at the cloud server 401 determines when a user indicates that the predicted action or actions (e.g., action A and action B) is/are undesirable (e.g., "Er") and also determines when no error is indicated ("Null"), and uses the determination as feedback to the RNNs 521 to further train the local neural network module 422, and uses the determination as feedback to the cloud server 401 (e.g., the action generating module 412 of the cloud server 401) to further train the cloud server 401. Thus, event data from separate edge events over a period of time are utilized to improve the accuracy (confidence) of the actions, both at the edge device 402 (predicted actions) and at the cloud server 401 (rules-based actions) in the machine reasoning environment 400.

Figure 7:
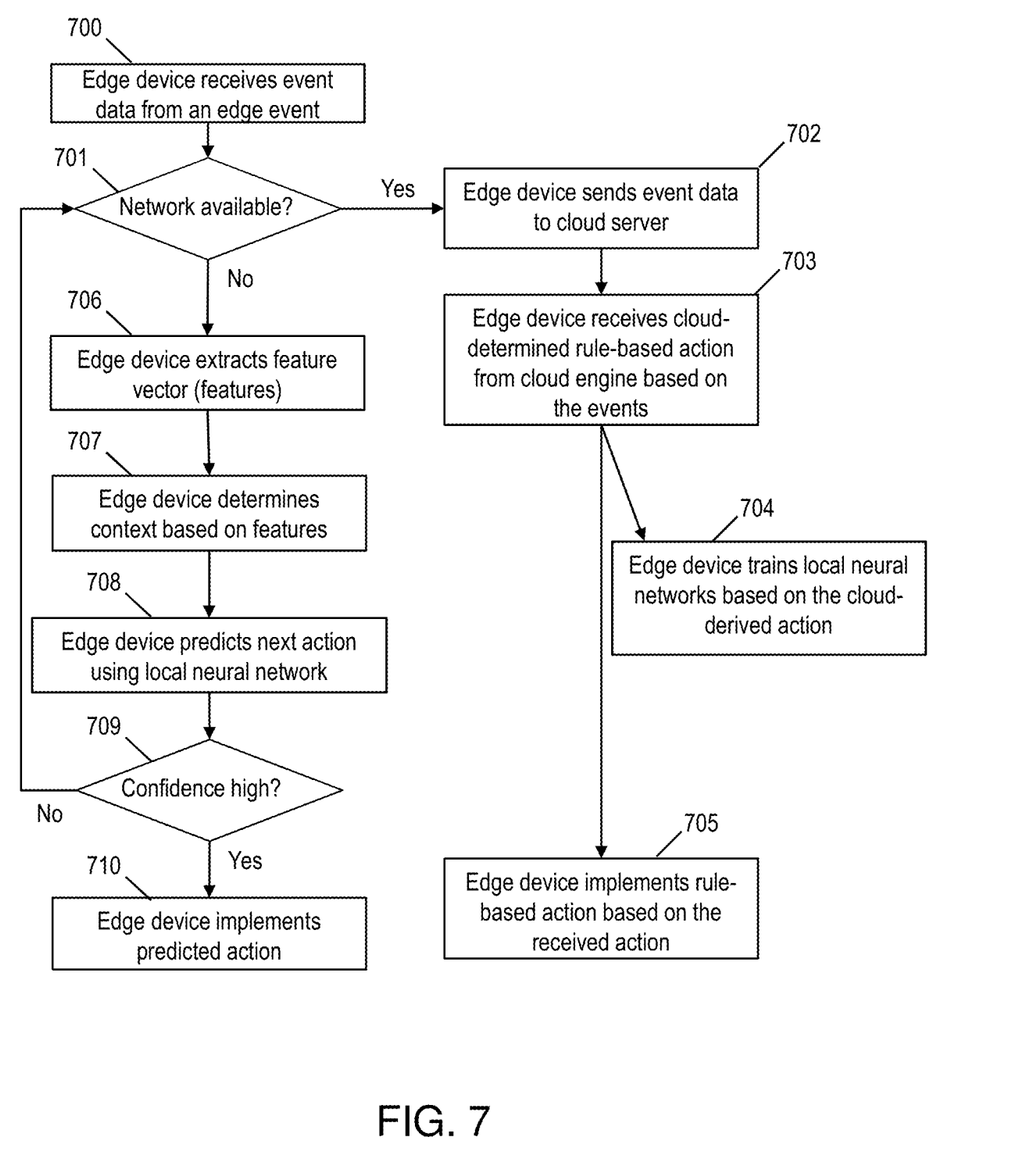
FIG. 7 shows a flowchart of steps of a method in accordance with aspects of the invention.

FIG. 7 shows a flowchart of an exemplary method in accordance with aspects of the present invention. Steps of the method may be carried out in the environment of FIGS. 4-6 and are described with reference to elements depicted in FIGS. 4-6.

At step 700, the edge device 402 receives event data (e.g., event data 414) during an edge event. The term edge event as used herein refers to user input events, wherein the input may be in the form of audio data, image data, text-based data, or combinations thereof. In one example, an edge event is triggered when an edge device 402 in the form of a voice-responsive intelligent personal assistant device recognizes the receipt of new user input (e.g., a voice command of a user).

At step 701, the edge device 402 determines if a network connection 404 to the cloud server 401 is available. The term available as used herein refers to a predetermined level of acceptable connectivity between the edge device 402 and the cloud server 401 via the network connection 404. If a predetermined level of connectivity is determined to be available through the network connection 404, the edge device 402 advances to step 702.

At step 702, the edge device 402 sends event data (e.g., structured or unstructured event data 414) received at step 700 to the cloud server 401 via the network connection 404. In embodiments, the event data is converted to text-based data by the edge device 402 before it is sent to the cloud server 401 at step 702.

At step 703, the edge device 402 receives a cloud-determined action(s) (e.g., rule-based action data 413) from the cloud server 401 in response to the step 702. In aspects, the cloud-determined action(s) is/are generated by the cloud server 401 utilizing existing cloud engine techniques and tools. Unlike conventional smart devices which receive cloud-determined actions, the edge device 402 according to embodiments of the present invention utilizes the cloud-determined action(s) from a cloud server (e.g., cloud server 401) as training input for the local neural network (e.g., local neural network module 422), in accordance with step 704.

At step 704, the edge device 402 trains local neural networks (e.g., LSTMs 520 or RNNs 521) using the cloud-derived action(s) (e.g., rule-based action data 413). In implementations, the edge device 402 trains local neural networks based on features and context of the event data (e.g., event data 414) and the associated cloud-derived action(s).

At step 705, the edge device 402 implements the cloud-determined action(s) received at step 703. In one example, the edge device 402 receives cloud-determined actions that cause the edge device 402 to issue an audio communication to the user in response to a question or command (e.g., event data 414) received at step 700.

With reference back to step 701, if the edge device 402 determines that the network connection (e.g., network connection 404) is unavailable, at step 706, the edge device 402 determines features of the event data (e.g., event data 414). In aspects, the feature encoder module 421 of the edge device 402 extracts high-dimension feature vectors utilizing one or more CNNs (e.g., image CNN 515, voice CNN 516, image CNN 517) of the feature encoder module 421.

At step 707, the edge device 402 determines context of the event data (e.g., event data 414) based on the features extracted at step 706. In one example, features of image data (e.g., first image data 510 and second image data 512) are utilized by the edge device 402 to determine that a particular user is conducting the edge event at a particular location (e.g., at home), giving context to a question posed by the user during the edge event.

At step 708, the edge device 402 generates one or more predicted next actions (e.g., action A, action B) using a local neural network (e.g., LSTMs 520 or RNNs 521) within the edge environment (e.g., edge environment 403). In embodiments, the edge device 402 utilizes one or more LSTMs and RNNs of the local neural network module 422 to implement step 708.

At step 709, the edge device 402 determines if a confidence level for each of the one or more predicted next actions (e.g., action A, action B) meets a respective predetermined threshold value. In other words, the edge device 402 determines whether the confidence of the predicted next action(s) is high enough based on the predetermined threshold value. If the confidence level is high enough (meets the predetermined threshold value), the edge device 402 implements the predicted action(s) at step 710. Conversely, if the confidence level is not high enough (does not meet the predetermined threshold value), the edge device 402 returns to step 701.

At step 710, as noted above, the edge device 402 implements the one or more predicted actions determined at step 708. In one example, the predicted actions cause the edge device 402 to issue an audio communication to the user in response to a user question or command (e.g., event data 414) received at step 700. In implementations, training of the local neural network (e.g., LSTMs 520 and RNNs 521) with cloud-determined action data and feature and context data derived at the edge device 402, result in a convergence of the rule-based actions determined at the cloud server 401 and the predicted actions determined at the edge device 402. In other words, embodiments of the invention advantageously result in predicted actions by an edge device 402 that are the same or similar to rule-based actions that would be derived by the cloud server 401 but for a faulty network connection (network connection 404). Thus, embodiments of the invention advantageously generate one or more next appropriate actions for an edge device 402 to take during an edge event when a network connection is unavailable, thus preventing service downtime.

Conventional cloud-based smart devices, including service robots at homes or at banking branch offices, rely heavily on the availability of its cloud brain. In the case where a network connection in unreliable or intermittent, the conventional smart devices will not be able to function properly. Repeated action on such smart devices are triggered from the cloud. Rule-based robot behavior design and programming restricts the potential to build an "intelligent machine". Embodiments of the invention provide an IoT edge computing system (e.g., edge device 402) including a local neural network trained automatically to predict next actions based on received cloud-based actions (commands) and current context of the input data during an edge event. Moreover, embodiments of the invention include a local neural network at an edge device (e.g., edge device 402) which is utilized when the edge device loses its network connection, and when the local neural network has a high confidence for its predicted action. Based on the above, it can be understood that embodiments of the present invention overcome such network connection problems by providing a smart device (e.g., edge device 402) capable of generating a predicted next action based on local neural network trained with cloud-based action data and feature data derived by the edge device.

While referring to a single "edge device" herein, it should be understood that references to the edge device (e.g., edge device 402) may encompass multiple computing devices in an edge environment (e.g., edge environment 403).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by an edge computing device, event data from an edge event;
determining, by the edge computing device, that a network connection to a cloud server is not available;
extracting, by the edge computing device, features of the event data;
predicting, by a local neural network of the edge computing device, an action for the edge computing device to take based on the features of the event data, wherein the predicted action is associated with a confidence level;
determining, by the edge computing device, that the confidence level associated with the predicted action for the edge computing device to take does not meet a predetermined threshold value; and
determining, by the edge computing device, whether the network connection to the cloud server is now available in response to the determining that the confidence level associated with the predicted action for the edge computing device to take does not meet the predetermined threshold value.

2. The computer-implemented method of claim 1, further comprising:
receiving, by the edge computing device, event data from a new edge event;
predicting, by the local neural network of the edge computing device, a new action for the edge computing device to take based on features of the event data of the new edge event, wherein the new action is associated with another confidence level;
determining, by the edge computing device, that the other confidence level meets the predetermined threshold value; and
implementing, by the edge computing device, the new action based on the determining that the other confidence level meets the predetermined threshold value.

3. The computer-implemented method of claim 1, wherein the edge computing device determines that the network connection to the cloud server is now available, the method further comprising sending, by the edge computing device, the event data to the cloud server.

4. The computer-implemented method of claim 3, further comprising:
receiving, by the edge computing device, a cloud-determined action for the edge computing device to take based on the event data; and
providing, by the edge computing device, the cloud-determined action to the local neural network with the features of the event data for training of the local neural network.

5. The computer-implemented method of claim 4, wherein a feature encoder of the edge computing device performs the extracting of the features of the event data, the method further comprising receiving, by the feature encoder of the edge computing device, weight data from a pre-trained neural network of the cloud server for training of the feature encoder.

6. The computer-implemented method of claim 1, wherein a feature encoder of the edge computing device performs the extracting of the features of the event data utilizing convolutional neural networks of the feature encoder.

7. The computer-implemented method of claim 1, wherein the event data comprises at least one of the group consisting of: audio data, and image data.

8. A computer program product comprising a computer readable storage medium having program instructions embodied therewith, the program instructions executable by a computing device to cause the computing device to:
receive event data from an edge event;
determine that a network connection to a remote cloud server is not available;
extract features of the event data;
determine context of the event data based on the features;
predict, by a local neural network of the computing device, an action for the computing device to take based on the features and context, wherein the predicted action is associated with a confidence level;
determine that the confidence level associated with the predicted action for the computing device to take does not meet a predetermined threshold value; and
determine whether the network connection to the remote cloud server is now available in response to the determining that the confidence level associated with the predicted action for the edge computing device to take does not meet the predetermined threshold value.

9. The computer program product of claim 8, wherein the program instructions further cause the computing device to:
   receive event data from a new edge event;
   predict, by the local neural network of the computing device, a new action for the computing device to take based on features of the event data of the new edge event, wherein the new action is associated with another confidence level;
   determine that the other confidence level meets the predetermined threshold value; and
   implement the new action based on the determining that the other confidence level meets the predetermined threshold value.

10. The computer program product of claim 8, wherein the computing device determines that the network connection to the cloud server is now available, and the program instructions further cause the computing device to send the event data to the cloud server.

11. The computer program product of claim 10, wherein the program instructions further cause the computing device to:
   receive a cloud-determined action for the computing device to take based on the event data; and
   train the local neural network using the cloud-determined action and the features of the event data.

12. The computer program product of claim 11, wherein a feature encoder of the computing device performs the extracting of the features of the event data, and the program instructions further cause the computing device to receive, by the feature encoder of the computing device, weight data from a pre-trained neural network of the cloud server for training of the feature encoder.

13. The computer program product of claim 12, wherein the feature encoder comprises convolutional neural networks for performing the extracting of the features of the event data.

14. A system comprising:
   a processor, a computer readable memory and a computer readable storage medium associated with a computing device;
   program instructions to receive event data for an edge event;
   program instructions to determine that a network connection to a remote cloud server is not available;
   program instructions to extract features of the event data;
   program instructions to predict, by a local neural network of the computing device, an action for the computing device to take based on the features, wherein the predicted action is associated with a confidence level of the prediction;
   program instructions to determine whether the confidence level of the predicted action meets a predetermined threshold value;
   program instructions to implement the action in response to a determination that the confidence level of the predicted action meets the predetermined threshold value; and
   program instructions to determine whether the network connection to the cloud server is now available in response to a determination that the confidence level of the predicted action does not meet the predetermined threshold value,
   wherein the program instructions are stored on the computer readable storage medium for execution by the processor via the computer readable memory.

15. The system of claim 14, further comprising:
   program instructions to send the event data to the cloud server in response to determining that the cloud server is now available;
   program instructions to receive a cloud-determined action from the cloud server based on the event data; and
   program instructions to train the local neural network using the cloud-determined action and the features of the event data.

16. The system of claim 15, wherein a feature encoder of the computing device performs the extracting of the features of the event data, and the system further comprises program instructions to train the feature encoder using weight data from a pre-trained neural network of the cloud server.

17. The system of claim 16, wherein the feature encoder comprises convolutional neural networks for performing the extracting of the features of the event data.

18. The system of claim 14, wherein the event data comprises at least one of the group consisting of: audio data, and image data, and wherein the computing device is a voice-responsive intelligent personal assistant device.

19. The computer-implemented method of claim 1, further comprising:
   determining, by the edge computing device, a context of the event data based on the features, wherein the predicting the action for the edge computing device to take is further based on the context of the event data.

20. The system of claim 14, further comprising:
   program instructions to determine a context of the event data based on the features, including a location of a user, wherein the predicting the action for the computing device to take is further based on the context of the event data.

* * * * *